United States Patent

[11] 3,539,065

| [72] | Inventor | David F. Brownell<br>1 Park St., Mattapoisett, Massachusetts 02739 |
|---|---|---|
| [21] | Appl. No. | 788,787 |
| [22] | Filed | Jan. 3, 1969 |
| [45] | Patented | Nov. 10, 1970 |

[54] TRAILER
5 Claims, 8 Drawing Figs.

[52] U.S. Cl. ................................................. 214/390,
214/515, 214/512
[51] Int. Cl. ........................................................ B60p 3/10
[50] Field of Search ........................................... 214/390–
–396, 505, 506, 512, 515; 280/414, 43.23

[56] References Cited
UNITED STATES PATENTS
3,103,371   9/1963   Young.................... 280/414

3,131,902   5/1964   Zak............................. 280/414
3,356,239   12/1967   Klein........................... 214/390

*Primary Examiner* — Albert J. Makay
*Attorney* — Finnegan, Henderson and Farabow ABSTRACT: A boat trailer is provided having a U-shaped frame and a pair of independent transversely spaced wheel assemblies for supporting the rear of the frame. Thus, an opening is provided that extends upwardly from the rear end of the frame. Spanning members, which extend across the opening to support a boat being transported on the trailer, are removable to permit the trailer to be driven away from a boat off-loaded onto blocking. Preferably the trailer includes jack means for raising and lowering the frame and engaging means for holding the boat on the trailer.

Patented Nov. 10, 1970

INVENTOR
DAVID F. BROWNELL

Finnegan, Henderson & Farabow
ATTORNEYS

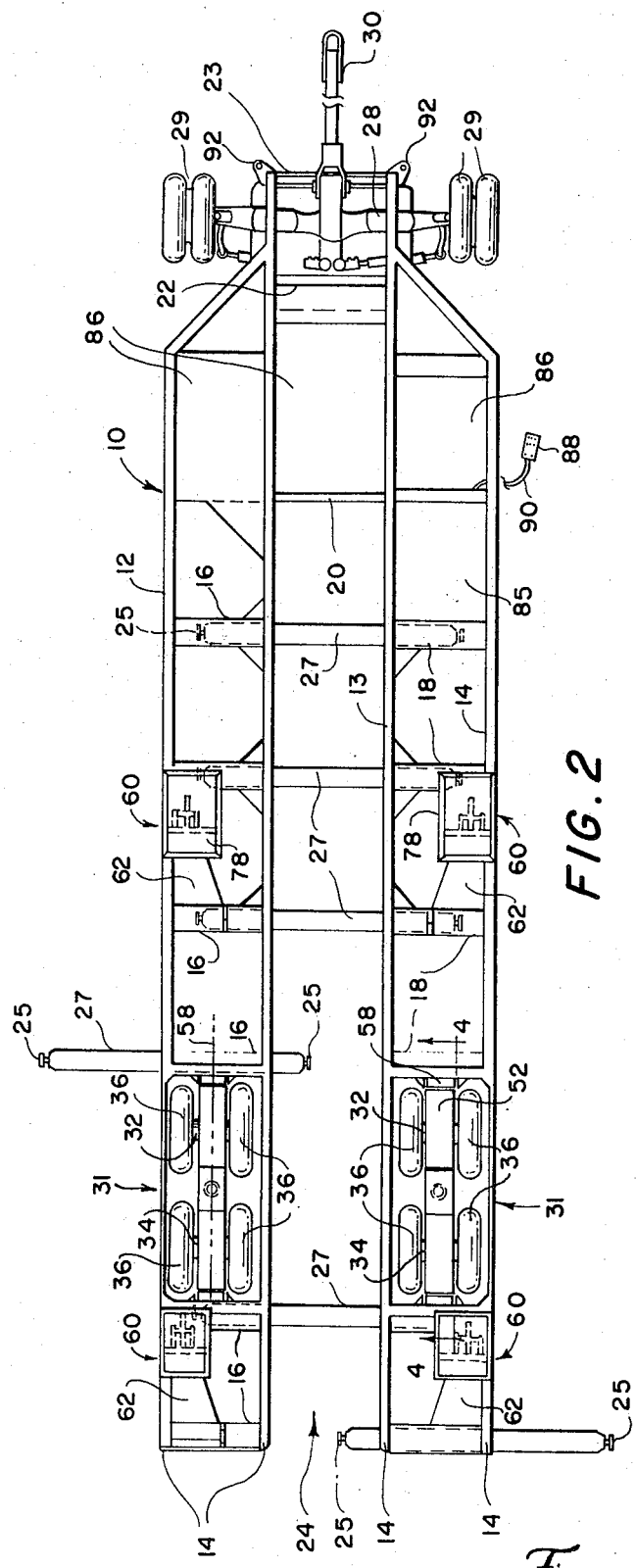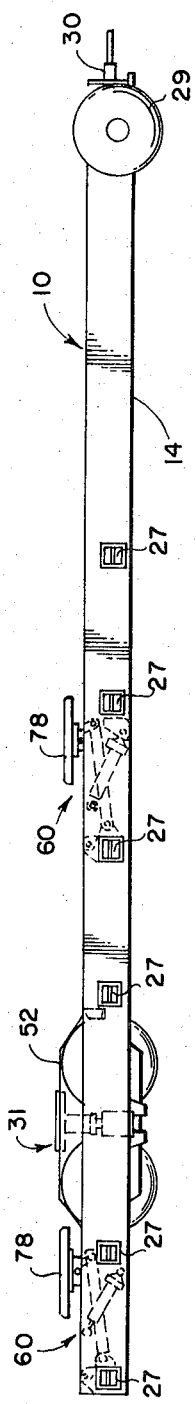

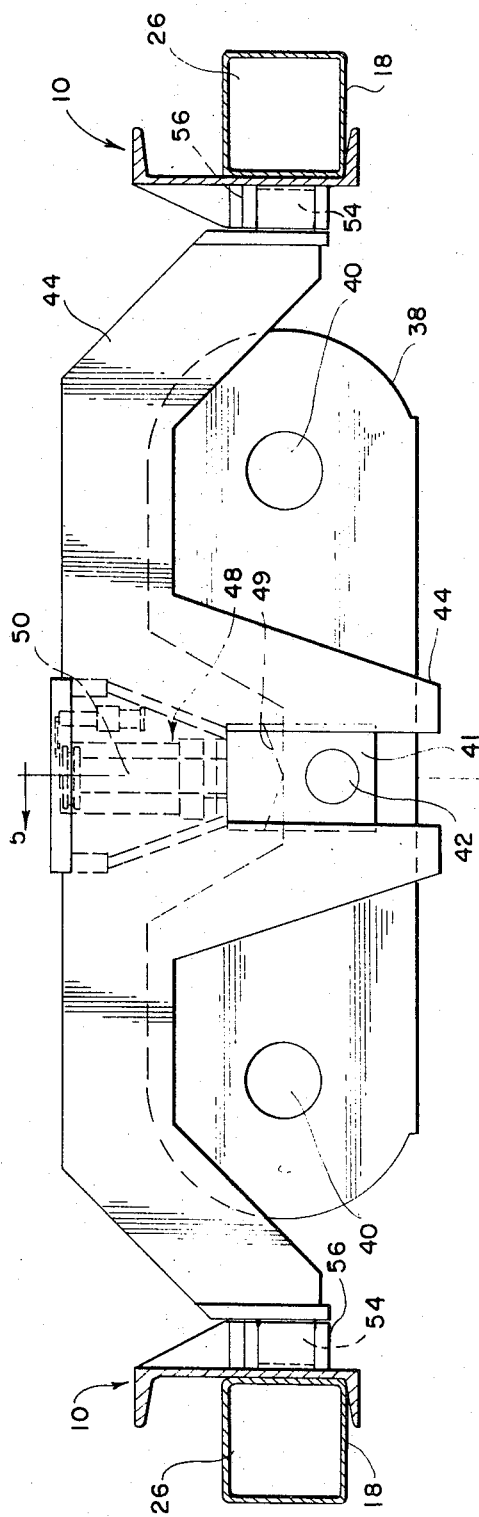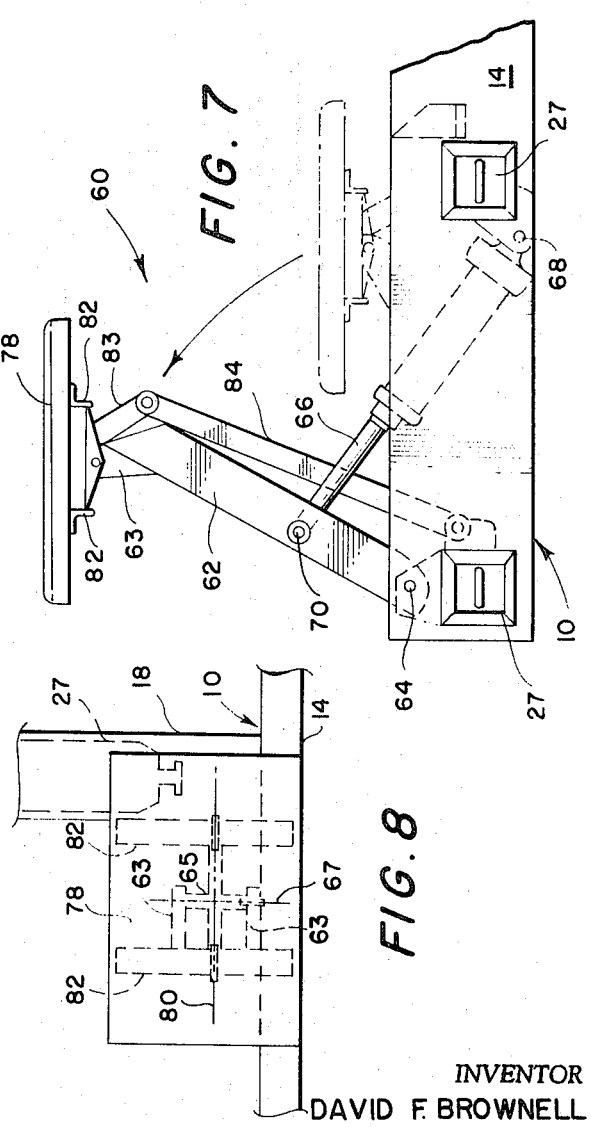

INVENTOR
DAVID F. BROWNELL

*Finnegan, Henderson & Farabow*
ATTORNEYS

TRAILER

This invention relates to trailers for receiving and transporting large bodies which have curved contours. More particularly, the trailer is capable of transporting relatively long marine craft and is so constructed that it can be immersed beneath a boat, and maneuvered to position the boat thereon, to remove the boat from the water, and to transport the boat to a desired location. Upon reaching its destination, the trailer permits easy off-loading of the boat.

Because of the trailer's suitability as a boat carrier, it will be so described. However, it will be apparent that the improved trailer construction can be incorporated in trailers used for transporting a variety of large bulky articles.

At present many types of boat trailers are commercially available to launch and retrieve a boat. Such trailers are generally designed for use with a fixed ramp that permits the trailer to be backed into the water so that a boat can be either floated onto the trailer, or floated away from the trailer.

Auxiliary equipment, such as a crane or other lifting means has generally been required to off-load large boats from a trailer at a dry land location. When such a lifting means is employed, elaborate cradles are usually employed to facilitate the unloading operation. Cradles are necessarily bulky structures which restrict access to the bottom, and thus interfere with maintenance work on the boat.

The difficulty of unloading large boats from trailers for storage in buildings and sheds has previously led to inefficient use of storage space. Herein it will be seen that the greatest width required for access of the loaded trailer of this invention is the bean of the craft and that the greatest height is that of the craft and the depth of the trailer below the craft's keel. Because of this, the loaded trailer can readily be moved into and out of storage sheds, the area required for storage will be a minimum, and efficient utilization of storage space can be achieved.

It is an object of this invention to provide a trailer having an improved article off-loading capability.

It is another object of the invention to provide a trailer upon which a boat can be readily positioned when afloat, and then transported and unloaded onto independent blocking means.

A further object of the invention is to provide a trailer having a width or breadth which does not exceed and may be less than the largest transverse dimension of an article positioned on the trailer.

A still further object of the invention is to provide a boat trailer that can off-load a boat onto a minimum of blocking to permit maximum access to the bottom of the boat for maintenance work.

Another object of the invention is to provide a boat trailer with an adjustable positioning means capable of engaging the bottoms of boats of various sizes and hull designs to permit interchangeable usage of the trailer with a large number of boats.

Generally the trailer comprises a frame having two longitudinally extending side members connected at their forward ends to form an opening extending inwardly from the rear end of the frame. The forward end of the frame is supported on suitable wheel means, and each side member is also supported by an independent rear wheel assembly. Spanning members, removably mounted on seating means on the side members, extend transversely across the opening.

Preferably, the side members have mounted on their upper surface a plurality of engaging means which are adjustable angularly and vertically; jack means are provided for elevating the frame in relation to the ground to permit insertion of blocking under an article positioned on the trailer and subsequent removal of the spanning members from the opening; and the rear wheel assemblies include at least two axles with at least two wheels on each axle.

The invention consists in the novel parts, constructions, arrangements, combinations, and improvements shown and described. The accompanying drawings which are incorporated in and constitute a part of this specification, illustrate certain embodiments of the invention, and together with the description, serve to explain the principles of the invention.

Of the drawings:

FIG. 2 is a plan view of the trailer of FIG. 1 and illustrates two of the spanning members in a partially removed position;

FIG. 3 is a side elevation view of the trailer of FIG. 2;

FIG. 4 is a side elevation view of a wheel assembly of FIG. 2 with the wheels omitted;

FIG. 7 is a side elevation view of an engaging means illustrated in FIG. 2; and

FIG. 8 is an enlarged top plan view of a portion of the engaging means of FIG. 2.

Figure 1:
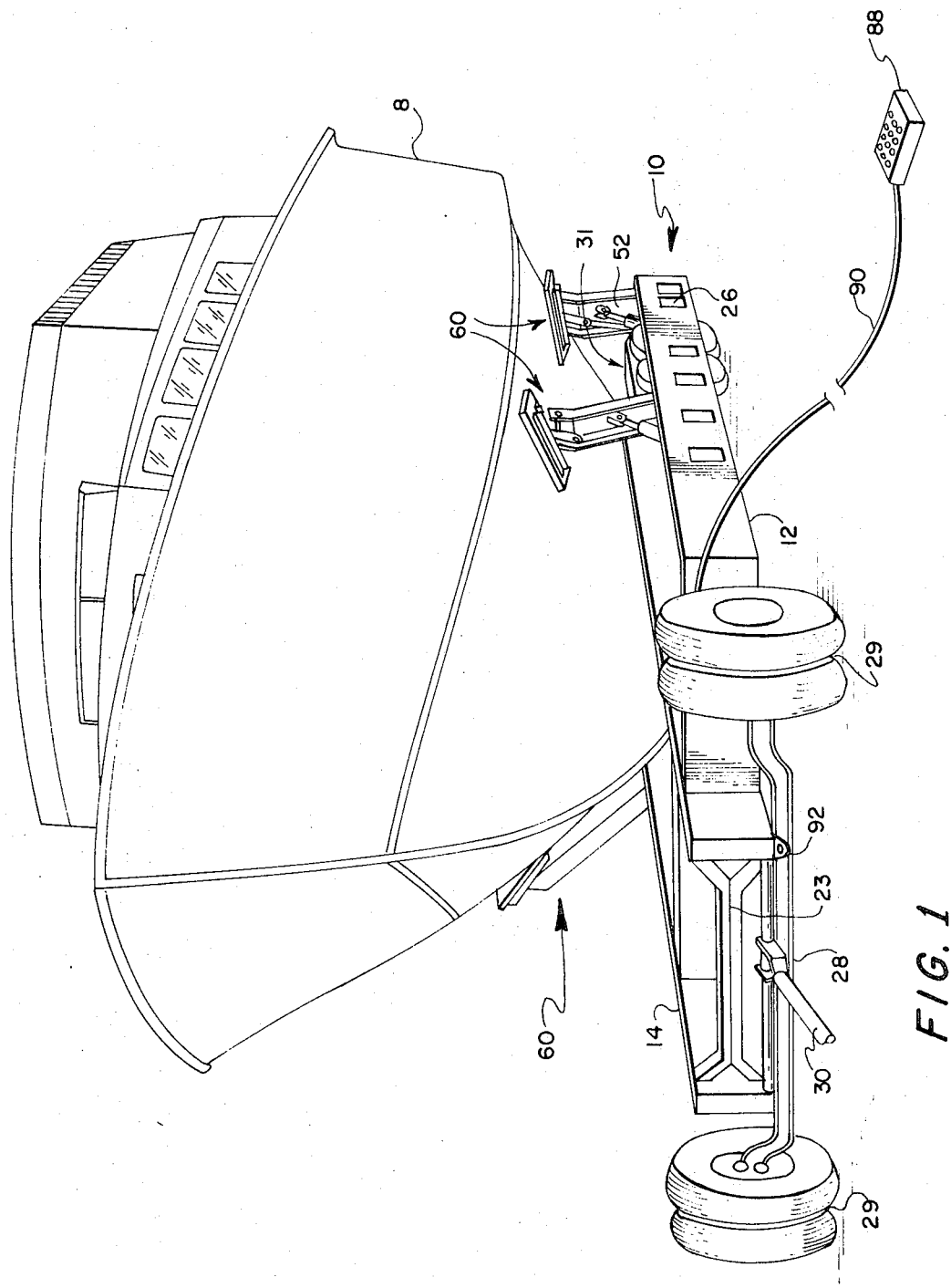
FIG. 1 is a perspective view of a presently preferred embodiment of the trailer of the invention.

Referring to FIG. 1, a boat trailer constructed in accordance with this invention is shown which is capable of transporting and off-loading a boat 8 of up to 45 feet in length, up to 30 tons in displacement, and having a variety of hull contours. The trailer includes a frame having a pair of transversely spaced side members interconnected at their forward ends to form a U-shaped frame having an opening that extends inwardly from the rear end of the frame. As here embodied, and as best seen in FIG. 2, a frame, generally 10, is provided that includes transversely spaced side members 12 and 13, each formed of two longitudinally extending beams 14 with transverse members 16 connecting the beams of member 12 and transverse members 18 connecting the beams of member 13.

Side members 12 and 13 are connected at the forward end of the frame by tying members 20, 22, and 23, and box structure 86 but are not connected near the rear of the frame. Thus, an elongated U-shaped frame is provided having a central opening 24 which extends inwardly from the rear end of the frame to tying member 20, a distance substantially the length of the frame.

In accordance with the invention, seating means are provided on the side members for mounting spanning members, that extend across the opening between the side members as described below. The seating means permit movement of the spanning members from the opening in the frame. As here embodied and as seen in FIGS. 1 and 4, the seating means comprise the central slot 26 formed by each of tubular members 16 and 18. Each transversely extending tubular member 16 is longitudinally aligned with a tubular member 18 to permit seating of the ends of a spanning member inserted in the slots of a pair of aligned tubular members.

In accordance with the invention, a plurality of removable spanning members are provided, for supporting the keel of a boat positioned on the trailer. The spanning members, which extend across the central opening to support the boat, are mounted on the seating means so that they can be removed from the opening to permit forward movement of the trailer away from a boat which has been unloaded from the trailer onto independent blocking inserted under the boat.

As here embodied and as shown in FIG. 2, a plurality of spanning members 27 that extend across central opening 24 are slidably mounted in slots 26 of tubular members 16 and 18. A handle 25 is provided at each end of each spanning member so that the spanning members can be manually removed from central opening 24 by sliding or pulling them out of the tubular members. Preferably, the spanning members 27 and the slot 26 in members 16 and 18 are rectangular in cross section.

Referring to FIGS. 1 and 2, the forward end of the frame is carried by a conventional front wheel assembly including an axle 28 extending between two sets of dual wheels 29 with a tow bar and hitch generally 30 connecting frame 10 with a tow vehicle (not shown).

In accordance with the invention, the after end of the trailer is supported by a pair of transversely spaced, wheel assemblies. Preferably these wheel assemblies pivot about both a horizontal longitudinal axis and a horizontal transverse axis with respect to the trailer frame to maintain the trailer frame level even when the wheels of the assembly are not at the same level. This construction eliminates the need for an axle extending across the trailer and permits a boat to be supported at a low elevation so that load stability is achieved, and the mount of vertical clearance required for the boat and trailer is minimal.

As here embodied, and as seen in FIG. 2, each wheel assembly, generally 31, includes a front axle 32 and a rear axle 34 each having a pair of ground contacting wheels 36 mounted thereon for transferring weight to the ground. Referring to FIG. 4, each wheel assembly also includes a dolly 38 having openings 40 in which front axle 32 and rear axle 34 are mounted in a conventional manner. Load is transferred from frame 10 to the ground through an outer housing 44 and a pivotable block 41 which is mounted on a shaft 42. Shaft 42 in turn is mounted on dolly 38 that transmits the load to the axles, the wheels, and then to the ground.

Outer housing 44, which transfers load from frame 10 onto shaft 42, has attached at each end a stub shaft 54 seated in a sleeve 56 mounted on frame 10. Thus, if the cross section of the ground surface being traversed by a wheel assembly is not even, the entire wheel assembly can pivot about longitudinal axis 58, seen in FIG. 2, while the frame of the trailer remains level.

Figure 5:
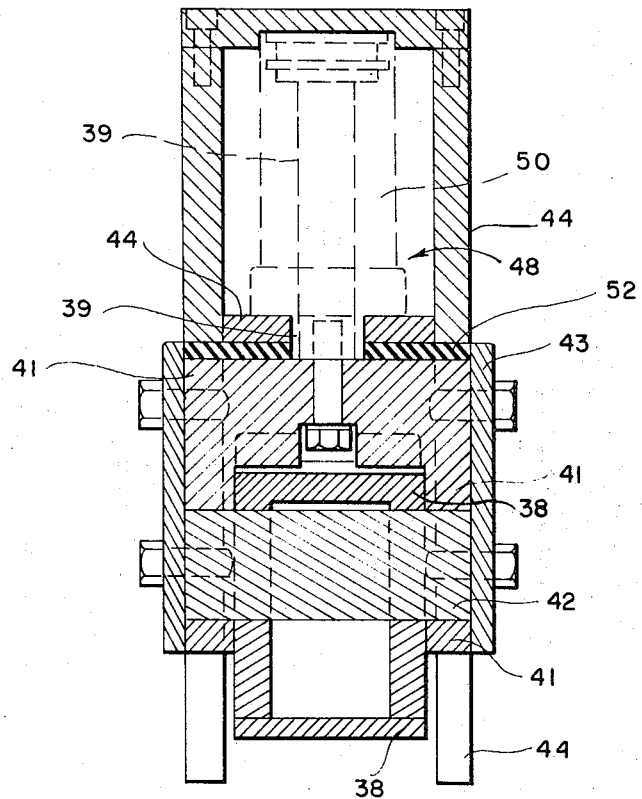
FIG. 5 is a section view taken along line 5–5 of FIG. 4.

Referring to FIG. 5, it can be seen that there is clearance between the top of dolly 38 and the adjacent lower surface of block 41. Thus, dolly 38 is pivotable about shaft 42 and can rock up and down to produce a walking beam action and uniformly distribute load on tires 36.

Figure 6:
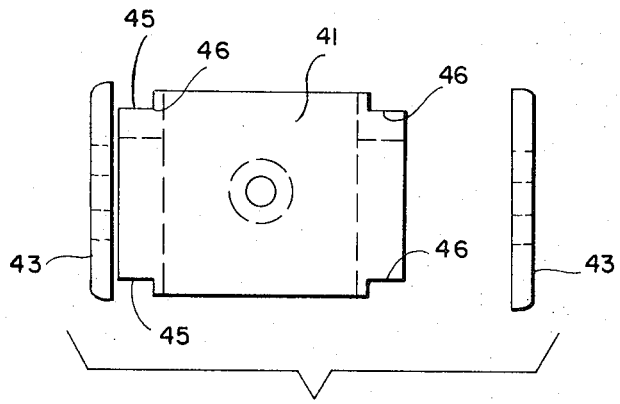
FIG. 6 is an exploded plan view showing the relationship of the block and the cover plates of a wheel assembly.

As seen in FIG. 6, vertical grooves 45 are formed by a pair of cover plates 43 and nicked corners 46 of block 41. The outer housing 44 is slidable in vertical grooves 45 which thus limit horizontal motion of outer housing 44 relative to block 41, and dolly 38 during up and down movement of outer housing 44 relative to dolly 38 as described below.

According to the preferred embodiment of the invention, and as illustrated in FIGS. 4 and 5, jack means, generally 48, are interposed between the wheels and the frame for raising the rear of the frame in relation to the ground during the off-loading of a boat. It should be understood that the provision of jack means, while desirable for convenience of off-loading, is not essential as it is possible to use independent jack means. Jack means, generally 48, comprises a conventional hydraulic cylinder 50 that is mounted within outer housing 44 and having its piston rod 39 seated on block 41. When hydraulic cylinder 50 is in closed position as shown in FIG. 5, load is carried on elastomer cushion pad 52, which is seated between block 41 and outer housing 44.

Engaging means can be provided for contacting the bottom of an article to prevent movement of the article on the trailer. Preferably, these engaging means comprise the novel adjustable pad assemblies discussed below, but other conventional engaging means can be used. The novel adjustable pad assemblies are mounted on the trailer frame and can be adjustably positioned to engage the bottoms of various articles such as boats having hulls of various sizes and cross sections. Further, these pads permit easy loading of a boat onto a trailer even when the trailer is submerged on a boat ramp, and are self-leveling to hold the boat relative to the ground.

Referring to FIG. 2, the engaging means comprises two pairs of pad assemblies, each pad assembly being generally denoted as 60. The pad assemblies of each pair are longitudinally aligned and positioned on opposite sides of the center line of the trailer. The pad assemblies thus engage the bottom of a boat at four spaced points and stabilize a boat positioned on the trailer.

As best seen in FIG. 7, each pad assembly 60 comprises a support arm 62 pivotably mounted on frame 10 at 64 and a hydraulic cylinder 66 mounted on frame 10 at 68. The movable piston of the hydraulic cylinder is connected to support arm 62 at 70 to permit the hydraulic cylinder to pivot arm 62 between a position generally parallel to frame 10 and the illustrated position of FIG. 7, with arm 62 extending vertically above frame 10.

With reference to FIG. 8, the free end of each arm 62 terminates in a pair of spaced fingers 63 that each include a journaled opening for pivotal mounting of a cross member 65. The cross member 65 and a resilient block generally 78 mounted on the cross member as described below, can pivot about a transverse axis 67 so that block 78 can engage a large surface area on a variety of boats having different hull contours.

Resilient block 78 is supported by frame members 82 that in turn are mounted on cross member 65. Block 78 is pivotable about a longitudinal axis 80 as shown in FIG. 8 because frame members 82 are pivotably mounted on cross member 65. Thus resilient block 78 can be swiveled (rotated about both the perpendicularly intersecting axes 67 and 80) to permit the block to engage a large surface area of boats having different hull shapes.

As best seen in FIG. 8, longitudinal axis 80 of cross member 65 is positioned outwardly of the longitudinally extending center of mass of resilient block 78. Thus the force of gravity acting on block 78 tends to pivot the block to an inclined position for receipt of a boat. An auxiliary support means interposed between block 78 and frame 10 is provided including lever 83 and connecting rod 84 as seen in FIG. 7. Lever 83 is directly connected to cross member 65 and connecting rod 84 is pivotably mounted on both lever 83 and frame 10 by rubber bushed pins. Thus, the auxiliary support means limits the rotational movement of resilient block 78 about axis 67 and keeps it approximately level throughout its travel. The rubber bushed pivot points on both ends of rod 84 allow block 78 to adjust upon contact to an irregularly shaped boat.

Referring to FIG. 2, watertight storage compartments 85 and 86 are provided for housing storage batteries and a conventional hydraulic pump and control system, respectively. An electrical switch box 88 attached to an extension cord 90 is provided to control the hydraulic system and permits an operator at a location remote from the trailer to operate the hydraulic system.

Referring to FIG. 2, tow plates 92 are attached to the front end of frame 10 to provide a convenient means for attaching a winch cable used in raising or lowering the trailer down a ramp.

The procedure for ramp loading of a boat from water onto the present boat trailer and for the dry land unloading of a boat from the trailer are described below. Before lowering the trailer down the ramp for the pickup of a boat, the position of pad assemblies 60 are adjusted to insure that the boat to be loaded can be centered on the trailer with its keel at the center line of the trailer. Also, it is necessary that spanning members 27 extend across opening 24 so that the keel of the boat can be floated onto the spanning members.

The trailer is lowered down a boat ramp, conveniently by a winch cable attached to a tow plate 92. When the trailer is submerged, the boat is maneuvered until it is centered over the submerged trailer. Subsequently, the pad assemblies 60 are raised to grasp the bottom of the boat. This operation can be accomplished by an operator on land actuating switch box 88 which will cause hydraulic cylinders 66 to pivot pad assemblies 60 in an upward direction.

After pad assemblies 60 are raised to grasp the bottom of the boat, the boat and trailer can be pulled from the water by the winch cable and the trailer is attached to the tow vehicle. It may sometimes be desirable to adjust the pad assemblies while the boat is being pulled from the water. Spanning members 27 support the weight of the boat while pad assemblies 60 securely position the boat on the trailer while transporting the boat to its desired location.

The first step in unloading the boat at a dry land location is to raise frame 10 by actuating hydraulic cylinders 50. The hydraulic cylinders raise outer housing 44, frame 10, and the boat relative to wheels 36 and ground level.

When the boat is in a raised position, blocking means such as wood blocking and/or tripod support stands can be positioned under the boat between the side members and spanning members as well as to the sides of the trailer. The height of the blocking and stands is selected to be above the height of the corresponding longitudinal portion of the trailer when the frame of the trailer is in its lowered position relative to the wheel assemblies. After the blocking and stands are in position, frame 10 and the boat are lowered, by relieving pressure in hydraulic cylinders 50. The boat comes to rest on the blocking and stands as frame 10 is lowered, and frame 10 continues its downward movement until spanning members 27 are lower than the level of the keel of the boat.

After the weight of the boat is supported by the blocking and stands, pad assemblies 60 are preferably pivoted into their lowest position and spanning members 27, which are not supporting the weight of the boat at this time, are pulled out of opening 24. The trailer is now clear of the boat and the blocking and can be pulled forward away from the boat.

The blocking means that receive the boat from the trailer can be precisely positioned before slowly lowering frame 10 and off-loading the boat onto the blocking means. Thus, a bulky cradle to receive the boat is not necessary and a minimum amount of blocking may be used to expose a maximum amount of boat surface for maintenance work.

Boats off-loaded onto blocking means by the trailer can subsequently be reloaded onto the trailer without the use of auxiliary equipment. Initially the trailer, with spanning members 27 removed from opening 24, is backed into the position the trailer was in during the off-loading operation. Subsequently, spanning members 27 are extended across opening 24 and seated in their respective slots. Pad assemblies 31 are adjusted upwardly so that they will cradle the boat when frame 10 is raised sufficiently to transfer the weight of the boat to spanning members 27. Subsequently, frame 10 is raised by hydraulic cylinders 50 and the weight of the boat is transferred from the blocking means to the spanning members. While frame 10 is raised, the blocking means can be removed. Subsequently, frame 10 is lowered by releasing the pressure in hydraulic cylinders 50 and the boat can be hauled away on the trailer.

The invention in its broader aspects is not limited to the specific details shown. For example, the spanning members could have one end hinged to one side member with the free end resting and pinned to an underlying plate on the other side members, and thus be capable of being pivoted out of its load-carrying position rather being drawn out of position. It should be recognized that the blocking and shoring will be in contact with the hull and very little clearance will be required to permit movement of the spanning members once the full weight has been shifted to the blocking. Other departures may be made from the specific details described without departing from the principles of the invention and without sacrificing its chief advantages.

I claim:

1. A boat trailer comprising:
   a. a frame having transversely spaced, longitudinally extending side members interconnected at their forward ends to form an opening extending inwardly from the rear end of the frame;
   b. forward wheel means for supporting the forward end of the frame;
   c. a pair of independent rear wheel assemblies with one assembly supporting the rear of each side member;
   d. jack means mounted on said wheel assemblies for raising said frame in relation to said wheel assemblies and the ground to permit insertion of independent blocking under a boat carried by the trailer and for subsequently lowering said frame to permit transfer of the weight of the boat from the trailer to the blocking;
   e. engaging means mounted on said frame for engaging the bottom of the boat to prevent transverse movement of the boat on the trailer;
   f. a plurality of spanning members supported by said frame and extending transversely across said opening in said frame to support the bottom of a boat positioned on the trailer, with said spanning members being movable relative to said frame to permit their removal from said opening to allow forward movement of the trailer away from the boat after the boat is unloaded onto independent blocking inserted under the boat.

2. The trailer of claim 1 wherein said engaging means comprises at least one pair of transversely spaced pad assemblies, each of said pad assemblies including a support arm pivotably mounted on said frame; a resilient block mounted on the free end of said support arm for pivotal movement about both a transverse axis and a longitudinal axis to permit said resilient block to swivel and engage a large surface area of boats having varying hull shapes; a hydraulic cylinder mounted on said frame with its movable piston connected to said support arm for pivoting said support arm and adjustably positioning said resilient block in boat-engaging positions spaced above said frame; and auxiliary support means interposed between said frame and said resilient block for limiting the pivotal movement of said resilient block relative to said support arm.

3. The boat trailer of claim 2 in which each wheel assembly comprises:
   a. an outer housing including a stub shaft at each end for mounting in sleeves on said frame to permit rotation of said housing about a given longitudinal axis;
   b. a dolly pivotally mounted on said outer housing to permit said dolly to rock up and down; and
   c. a front axle and a rear axle mounted on said dolly, each axle having at least one pair of ground contacting wheels mounted on opposite sides of said given longitudinal axis.

4. The trailer of claim 1 in which the jack means comprise a hydraulic cylinder.

5. A trailer comprising:
   a. a frame having transversely spaced parallel side beams rigidly interconnected at their forward ends by a transverse member to define a U-shaped opening extending to the rear end;
   b. movable spanning members extending transversely between the side members at spaced intervals rearwardly of the rigid interconnecting transverse member to subdivide the U-shaped opening into a plurality of successive openings;
   c. means for supporting said transverse members for movement of said spanning members relative to said U-shaped opening to permit forward movement of the trailer away from an article which has been off-loaded from the trailer away from an article which has been off-loaded from the trailer onto independent blocking inserted under the article;
   d. wheel means supporting the front end of the trailer;
   e. wheel means associated with each side beam adjacent the rear end thereof for supporting the rear end of the trailer; and
   f. engaging means for preventing transverse movement of an article on the trailer and including a support arm pivotably mounted on said frame; a resilient block mounted on the free end of said support arm for pivotal movement about both a transverse axis and a longitudinal axis to permit said resilient block to swivel and engage a large surface area of boats having varying hull shapes; a hydraulic cylinder mounted on said frame with its movable piston connected to said support arm for pivoting said support arm and adjustably positioning said resilient block in boat-engaging positions spaced above said frame; and auxiliary support means interposed between said frame and said resilient block for limiting the pivotal movement of said resilient block relative to said support arm.